United States Patent [19]

Kramer et al.

[11] Patent Number: 5,486,475
[45] Date of Patent: Jan. 23, 1996

[54] MEMBRANE MODULE TO REMOVE GASEOUS SUBSTANCES FROM A GAS STREAM

[76] Inventors: Valentin Kramer, Flurstrasse 3, 83620, Feldkirchen-Westerham; Gerd Ziegler, Johann-Sebastian-Bach Str. Strasse 2 85591, Vaterstetten, both of Germany

[21] Appl. No.: 195,884

[22] Filed: Feb. 9, 1994

[30] Foreign Application Priority Data

Feb. 10, 1993 [DE] Germany .......................... 43 03 936.7

[51] Int. Cl.$^6$ .............................. C12M 1/00; C12S 5/00; B01D 63/08
[52] U.S. Cl. .................. 435/266; 435/293.1; 435/297.1; 95/45
[58] Field of Search .................................. 435/266, 287; 95/45, 50

[56] References Cited

U.S. PATENT DOCUMENTS

| | | | |
|---|---|---|---|
| 3,184,395 | 5/1965 | Brewer ........................................ | 195/80 |
| 3,941,662 | 3/1976 | Munder et al. .......................... | 195/127 |
| 3,953,566 | 4/1976 | Gore ......................................... | 264/288 |
| 3,984,324 | 10/1976 | Wang ........................................ | 210/232 |
| 4,187,390 | 2/1980 | Gore ......................................... | 174/102 |
| 4,416,993 | 11/1983 | McKeown ................................. | 435/243 |
| 4,735,718 | 4/1988 | Peters ....................................... | 210/610 |
| 5,116,506 | 5/1992 | Williamson et al. ............... | 210/321.75 |

FOREIGN PATENT DOCUMENTS

| | | | |
|---|---|---|---|
| 2825788 | 6/1978 | Germany . | |
| 2823057 | 11/1979 | Germany ....................... | B01D 13/00 |
| 3125222 | 6/1981 | Germany . | |
| 3542599 | 12/1985 | Germany ....................... | B01D 53/34 |
| 3918430 | 6/1989 | Germany . | |
| 4027126 | 8/1990 | Germany . | |
| 9010690 | 9/1990 | WIPO ............................. | C12N 5/00 |
| WO92/03534 | 5/1992 | WIPO ............................. | C12M 3/00 |

OTHER PUBLICATIONS

Baurle, U et al., "Process and Device to Eliminate Puritees that are Readily Volatile and Scarce ly Soluble in Water From an Exhaust Stream by Biological Oxidation". Translations of DE 3542599A1, published in Germany on Jun. 4, 1987, pp. 1–8.

*Primary Examiner*—Michael G. Wityshyn
*Assistant Examiner*—Timothy J. Reardon
*Attorney, Agent, or Firm*—Victor M. Genco, Jr.

[57] ABSTRACT

A membrane module is provided which serves to remove gaseous substances from a gas stream and which consists of a plurality of plane membrane pockets consisting of a gas-permeable, liquidproof material. The pockets are arranged in parallel to each other and in parallel to the flow direction of the gas stream. The membrane pockets contain a liquid reaction mixture or a suspension of microorganisms which react with certain constituents of the gas stream which passes the pockets. An essential part of the pockets is a circumferential frame which is connected with both sides of the membrane material. The frame is provided with supply bore holes and drainage bore holes which are connected with the interior of the pocket. When the frames are stacked on each other, these bore holes are positioned on top of each other thus forming supply and drainage channels through which the reaction mixture or suspension in the rockets can be renewed and discharged. The membrane module forms a compact unit consisting of simple components, is easy to assemble and is very versatile.

16 Claims, 4 Drawing Sheets

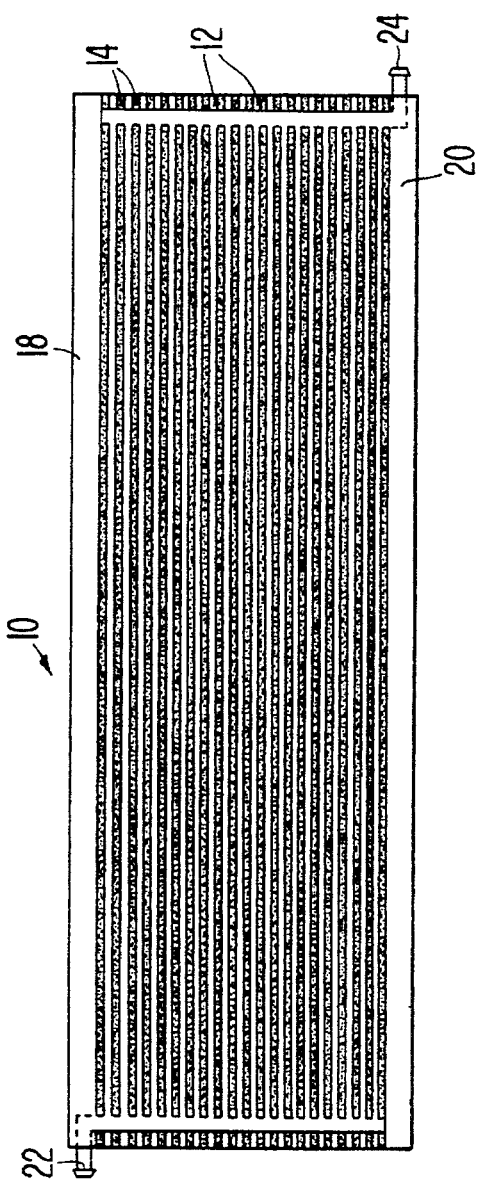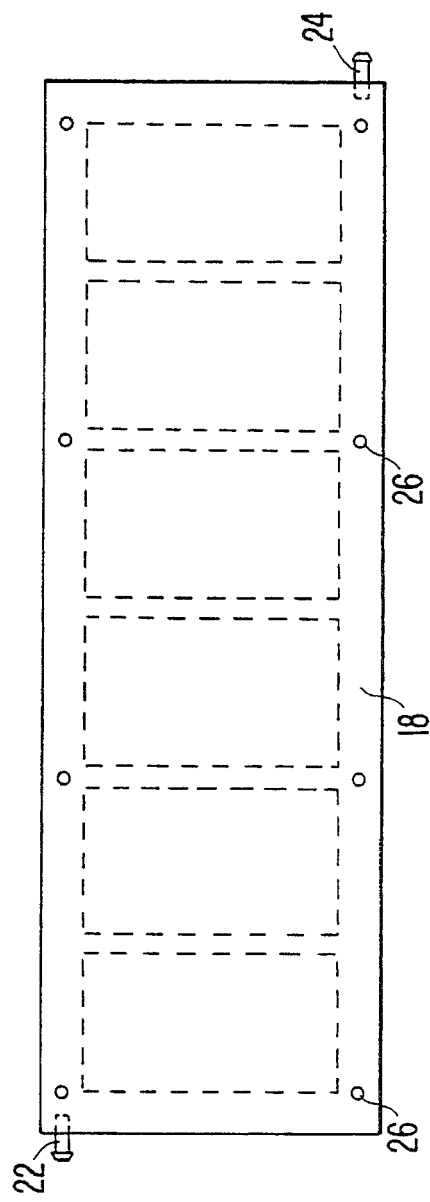

5,486,475

MEMBRANE MODULE TO REMOVE GASEOUS SUBSTANCES FROM A GAS STREAM

FIELD OF THE INVENTION

A membrane module is provided which serves to remove gaseous substances from a gas stream and which consists of a plurality of rectangular, planar membrane pockets made from a gas-permeable liquidproof material. The pockets are arranged in parallel to each other and in parallel with the flow direction of the gas stream and the membrane pockets are designed to accommodate a suspension of microorganisms or another liquid reaction mixture which may be charged through a supply line and discharged through a drainage line. Spacers are provided laterally between the membrane pockets thus defining a minimum distance between the membrane pockets so that the gas stream can flow through the formed chambers. A device which utilizes the above-mentioned modules and a process which removes gaseous substances from a gas stream is also provided.

BACKGROUND OF THE INVENTION

DE-A-4027126 describes membrane modules comprising pockets which are arranged in parallel. These modules consist of a box-shaped housing in which the membrane pockets, whose outer dimensions correspond to the inner housing dimensions, are arranged. Between the membrane pockets, along the lateral edges, there are rod-shaped spacer elements which define a certain distance between the membrane pockets. The membrane material may additionally have prominences or reinforcements, which ensure that a certain distance between two membrane pockets is ensured over the entire surface. Each membrane pocket is provided with a supply tube and a discharge tube which go into one common supply and discharge tube. The membrane material used is gas permeable and liquidproof. Preferably a polyurethane film is used.

If such a membrane module is used, for example, as a means for flue gas purification, considerable membrane surface is needed. To make the process economical, manufacturing expense must be minimized. Connecting each pocket with its separate supply and discharge tube is time consuming, complicated and failure-prone. Another shortcoming is the fact that the membrane pockets bulge with the weight of the liquid in the pockets and thus reduce the cross-section which is free for gas permeation. The exact flow resistance is very difficult to calculate because it varies with time.

When the lateral surfaces of the membrane pockets are provided with prominences, the membrane becomes more expensive to produce and the efficiency of the substance exchange through the membrane is reduced.

Since the membrane pockets are held only laterally, the flexible front edge may turn back under the accumulated dynamic pressure of the gas Flow and clog adjacent interstices which were intended for the passage of gas.

Considering the various opportunities to use such modules, such as in flue gas purification, there is a need for a membrane module of simple design which can be economically manufactured and which is designed such that it ensures defined substance exchange conditions also over long operation times.

SUMMARY OF THE INVENTION

A membrane module for removal of gaseous substances from a gas stream is provided. The module consists of a plurality of membrane pockets made of a gas-permeable liquidproof material which are arranged in parallel to the flow direction of the gas stream and are designed to take up a mixture of either a liquid reaction mixture or suspension of microorganisms that are charged via a supply device and discharged via a discharge device and wherein spacers are provided between membrane pockets that form chambers. Each membrane pocket is provided with a flat circumferential frame which determines the outer contours of the pocket and which is covered on both sides with the membrane material connected to the frame in a sealing manner and which is provided with at least one supply bore hole and at least one drainage bore hole which goes through the membrane and which is connected with the chamber enclosed by the membrane and frame by another bore hole. A plurality of pockets are stacked on top of each other in such a way that the supply bore holes and drainage bore holes lie on top of each other and form uninterrupted channels. The stack is enclosed by two plates in which the first plate is a top plate and the second plate is a floor plate which incorporate supply channels and drainage channels that are connected with the supply bores and drainage bores respectively. Further construction limitations are provided. A process is also provided.

BRIEF DESCRIPTION OF THE DRAWINGS

FIG. 1a is a schematic side view of a membrane module.

FIG. 1b is a top view of the membrane module.

DETAILED DESCRIPTION OF PREFERRED EMBODIMENTS

Figure 2:
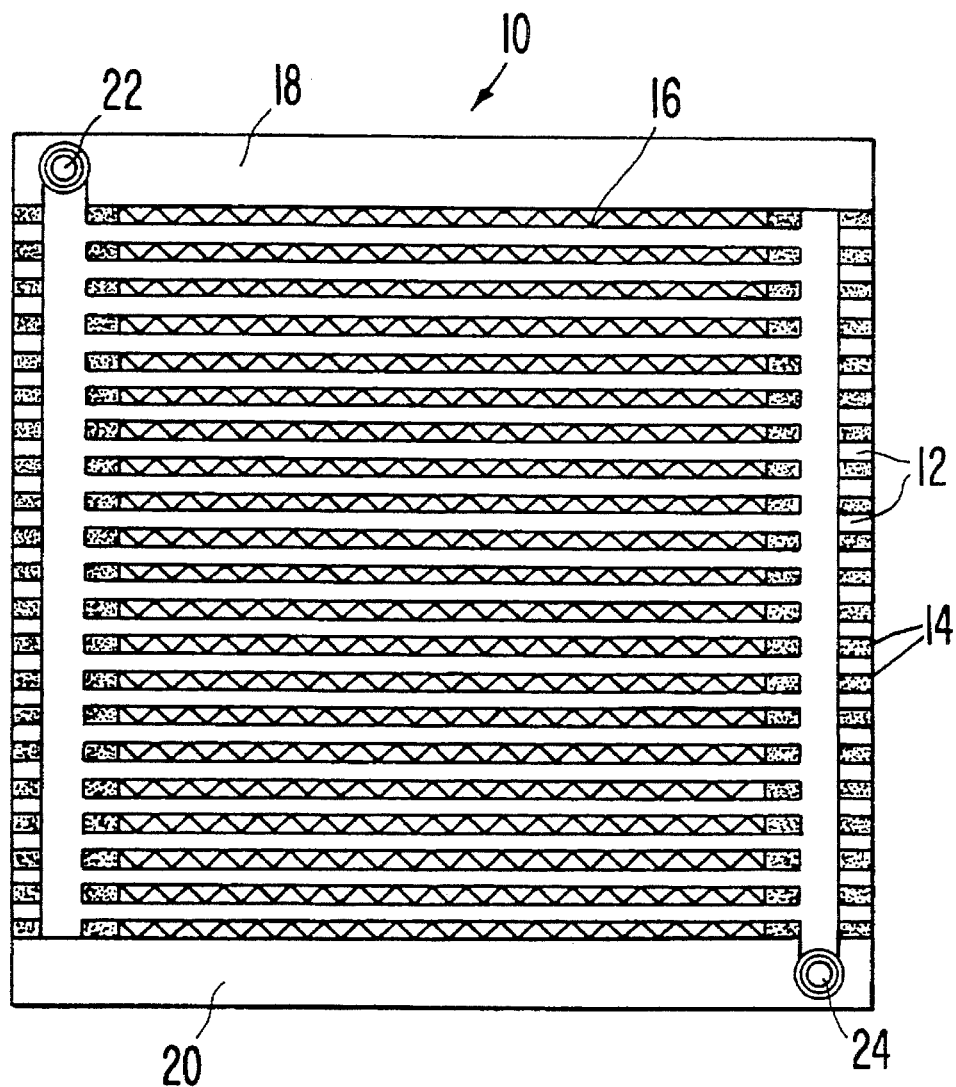
FIG. 2 is a schematic cross-section of the membrane module.

The present invention provides a membrane module in which each membrane pocket has its own frame which is covered by the membrane material on both sides. The membrane material is welded or glued to the frame, which is advantageous insofar as the membrane materials themselves can often not be welded together, whereas they can be welded to other materials.

The interior of the membrane pocket is accessible via supply and drainage bores in the frame legs. When several of these membrane pockets are stacked on one another, the bores are superimposed and form a channel through which the liquid reaction medium can be fed into the pockets or drained therefrom.

Normally the membrane pockets are not directly superimposed but sealing strips are arranged at the lateral edges between the membrane pockets. The thickness of the sealing strips defines the space which is available for the gas flow between the membrane pockets. The seals, which also serve as spacers, include bore holes of a size and arrangement corresponding to those in the frames of the membrane pockets, so that the supply and drainage channels are not interrupted when the membrane pockets and seals are stacked on each other. A stack of membrane pockets are enclosed by a cover plate and a floor plate which incorporate supply channels and drainage channels. These channels are in connection with the bores or the channels which are formed by the bores.

Supporting structures are inserted between the membrane pockets. For a better positioning of these supporting structures, it is advantageous if the lateral frame legs are connected with each other by cross members. The supporting structures may be propped by these cross members. A rigid foil with a zig-zag profile has proven suitable for the supporting structure. The foil may consist of aluminum. It is, however, also possible to use a supporting structure in the form of an open-pored layer formed by flex-resistant fibers or wires. The structure should be difficult to compress and constitutes as low a resistance as possible to the gas flow.

Such a membrane module is compact, consists of a few individual parts only and therefore is assembled without difficulties. It offers defined flow conditions which remain constant even over extended operating times. The modules are easy to combine into larger units when built into appropriate housings.

The efficiency rate of the substance exchange of such modules is dependent on the design of the modules, which mainly controls the flow conditions, but also on the membrane used. The microbiological state of the art includes the growing of cell cultures in membrane pockets which are air permeable and liquidproof. Polyurethane, polyethylene and polypropylene may be used as the membrane materials as referred to in U.S. Pat. No. 3,184,395, and also ethylene-propylene copolymers as referenced in U.S. Pat. No. 3,941,662 and silicone rubber as referenced in WO-90/10690.

What all these membranes have in common is their gas-permeability (specifically to oxygen). This does, however, not automatically mean that larger molecules such as toxins can pass through the membrane in the same way. Therefore it is critical to optimize the membrane materials used and to improve the efficiency. Surprisingly enough, microporous expanded polytetrafluoroethylene (hereinafter referred to as PTFE) membrane has turned out to be particularly suitable for the substance exchange. The membranes are commercially available under the tradename of GORE-TEX® (registered trademark of W. L. Gore & Associates, Inc.). Due to their properties, which allow water vapor and air to pass through but which keep back water, such membranes are used on a large scale in sportswear. Their production is described in U.S. Pat. Nos. 3,953,566 and 4,187,390 to whose disclosures express reference is made herewith.

Since the film thickness and pore diameter of such membranes can be effectively controlled, the suitable membrane for each substance exchange system can be developed by a few routine tests. The difference in efficiency between a membrane module equipped with a polyurethane film and a membrane module equipped with a PTFE-membrane is significant. Due to the simple construction and high efficiency rate of PTFE membranes, the membrane modules of the present invention are suitable not only for flue gas purification with the help of microorganisms but also generally as reactors for substance exchange systems in gaseous and liquid form. The hydrophobic behavior of the PTFE-membrane and the largely variable pore size are particularly advantageous.

The invention is best understood by reference to the accompanying figures.

FIG. 1a shows a schematic side view of the invention module. The membrane module 10 consists of numerous superimposed membrane pockets 12 which are kept apart by lateral spacers or seals 14. The thickness of the seals 14 determines the width which is left free between the individual membrane pockets 12 and which must be permeated by the gas stream to be purified.

As is particularly shown in FIG. 2, this free space between the individual membrane pockets is filled by a supporting structure 16, which is a rigid foil with a zig-zag profile. Other supporting structures may also be used so long as the cross-section for the gas flow is reduced as little as possible and that the layer is almost incompressible.

The stack of superimposed membrane pockets 12 is enclosed by a cover plate 18 and a floor plate 20. These plates incorporate supply and drainage channels 22, 24 through which all membrane pockets 12 can be jointly supplied. These channels may be in the form of grooves milled into the underside of the cover or floor. The connection of these grooves lying on the stack of membrane pockets and having a sealing effect therewith the supply and drainage bores for the individual membrane pockets is particularly simple.

The stack of membrane pockets with cover and bottom plates can be held together by screw bolts which reach from corresponding bore holes in the seals 14 and the membrane pockets 12 from the cover plate 18 up to the floor plate 20 and span them together. The bore holes for such attachment bolts are marked with the reference number 26 in FIG. 1b.

Figure 3:
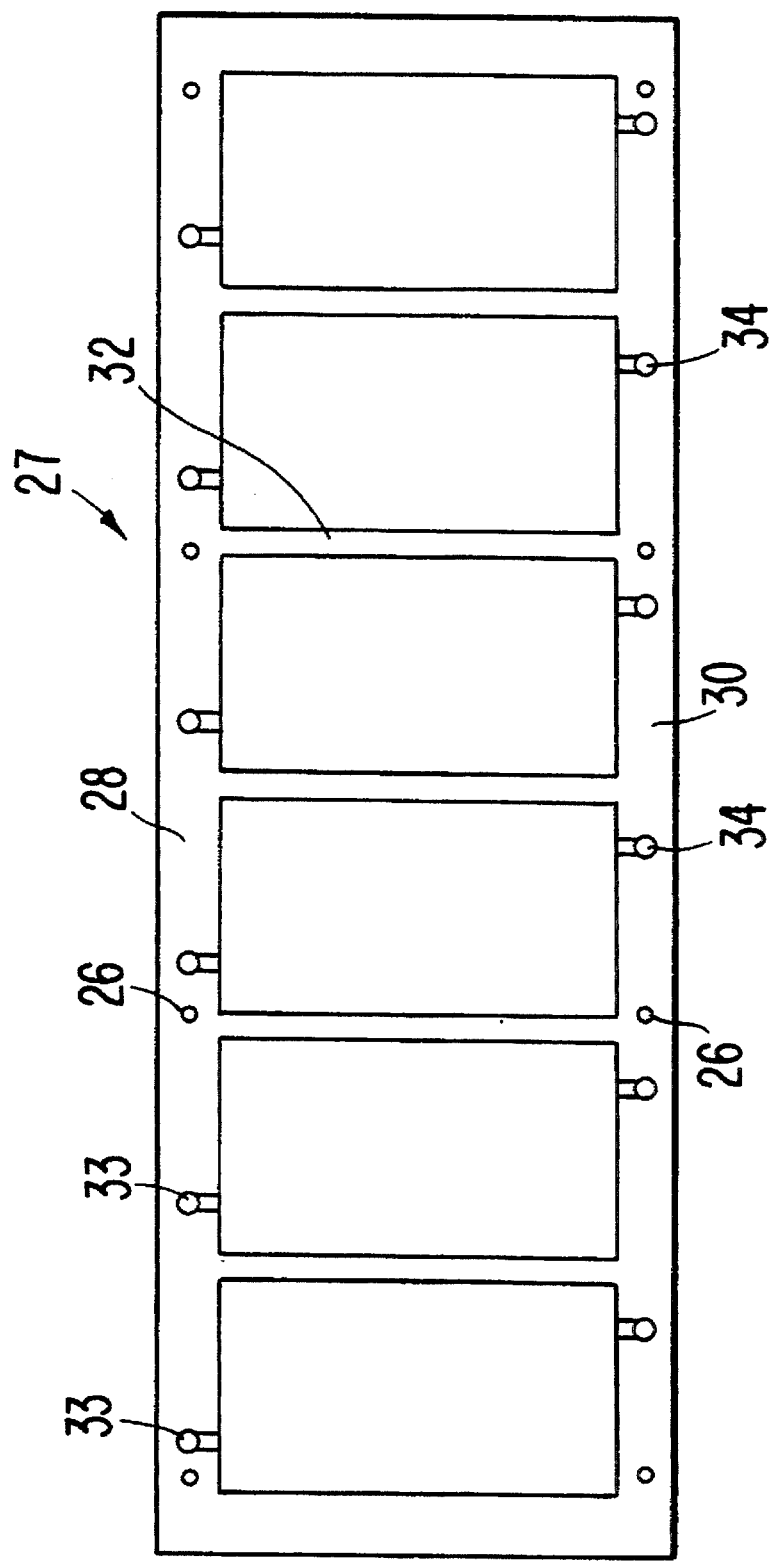
FIG. 3 is a top view of the frame as part of the membrane pocket.
Figure 4:
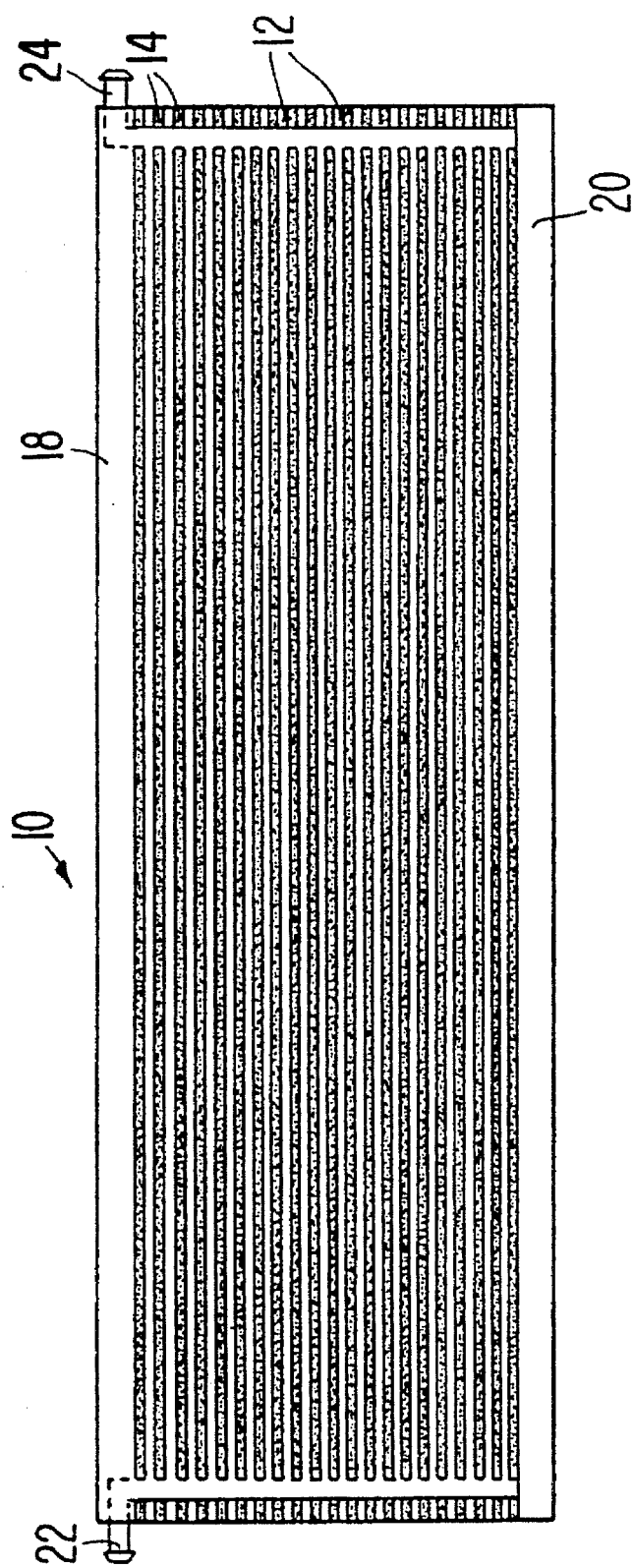
FIG. 4 is a schematic side view of a membrane module wherein supply and drainage channels are arranged in a top plate and are sealed at the bottom plate.

FIG. 3 shows a frame which forms an essential component of each membrane pocket. The frame 27 is basically rectangular and has two lateral legs 28 and 30 which are connected with each other by cross members 32. The cross members 32 are optional; they are advantageous only because the supporting structures 16 can be supported against these elements when the membrane module has been assembled. The two leg ends 28, 30 are connected with each other by short legs. A closed frame is formed whose thickness determines the inner volume of the membrane pocket. The thickness of the frame 27 may approximately correspond to the thickness of the lateral spacers or seals 14 as can be seen in FIG. 2.

Supply bores 33 and drainage bores 34 are located in the two facing frame legs 28 and 30. Punched grooves connect the bores with the interior of the frame which is enclosed by a thin membrane welded or glued onto both sides of the frame. The membrane is interrupted only at the supply bores 33 and the drainage bores 34. In the embodiment of the frame shown, the cross members 32 define six chambers which are each charged via a supply bore 33 and discharged by a drainage bore 34. The provision of the cross members 32 is optional. If such members are not present, one supply bore 33 and one drainage bore 34 suffices.

The preferred frame material is polypropylene. However, any other plastic material of sufficient rigidity is also suitable. The frame material needs to be a material that can be easily welded to the membrane which covers it. In case of a microporous expanded PTFE-membrane, a GORE-TEX® membrane measuring 5 to 200 micrometers, preferably 10–50 micrometers, and most preferably 30 micrometers in thickness and 0.02–1 micrometers, preferably 0.05–0.2 micrometers, and most preferably 0.2 micrometer in pore size is particularly suitable. PTFE-membranes can be welded to a frame consisting of polypropylene.

The membrane may be connected with an air permeable carrier material because the membrane itself is very thin and may therefore be of a low mechanical strength. This carrier material may consist of a non-woven, a perforated film or a textile material. In this case the membranes are connected with the carrier material and the carrier material is connected with the frame, preferably welded or glued. The combination of the membrane with a carrier material improves the rigidity of the membrane and allows for a good weldability to the frame.

A plurality of membrane pockets 12 are stacked on top of one another as shown from FIGS. 1a and 2. Since the bores 33 and 34 are arranged identically in each frame 27, the bores form channels with corresponding bore holes in the spacers or seals 14 through which the liquid reaction medium can flow into the membrane pockets 12 through the supply channels 22 and be drained therefrom through the drainage channels 24. The use of separate tubes can be dispensed with. The modules become extremely compact and resistant to failure. The complicated connection of tubes to each membrane pocket, which had been necessary in the state of the art is thus rendered superfluous.

Several modules of this type may be arranged and connected by currently existing technology in corresponding housings. FIG. 2 shows clearly that the free cross-section available for the through-flow of the gas to be purified is clearly defined and does not change due to the supporting structures mounted between the membrane pockets.

The simple an uncomplicated module construction allows for an economical use, not only in microbiological flue gas purification but also in other fields. The use in microbiological flue gas purification, however, is particularly promising, especially when a suitable microporous expanded PTFE-membrane is used.

We claim:

1. A membrane module for removal of undesirable gaseous substances from a gas stream comprising:
   (a) a plurality of membrane pocket assemblies, having planar surfaces, that are stacked on top of one another so as to be parallel to the direction of flow of the gas stream, wherein each assembly further comprises:
      (i) a flat circumferential frame having a top surface and a parallel bottom surface and an interior space, wherein the frame determines the outer contours of the assembly, said frame including a supply bore and a drainage bore, both bores connected to the interior space of the frame;
      (ii) a gas permeable liquidproof membrane that covers both the top and bottom surfaces of the frame and forms a pocket around the interior space of the frame; and
      (iii) a mixture, suitable for reaction with said undesirable gaseous substances, selected from the group consisting of a reaction liquid and a suspension of micro-organisms is located within the pocket, wherein the mixture enters the pocket through the supply bore of the frame and exits through the drainage bore of the frame;
   (b) a plurality of spacers wherein a spacer is located at opposite sides of the module and between the adjacent pocket assemblies to form an area between the adjacent assemblies through which the gas stream flows, and further wherein the spacers along one side have supply channel holes for location of a supply channel and the spacers along the other side have drainage channel holes for location of a drainage channel;
   (c) said supply channel extends to all of the membrane pocket assemblies and connects with the supply bores in the frames, and further extends through said spacers via the supply channel holes, said supply channel providing the mixture only to the pockets via the supply bores within said frames;
   (d) said drainage channel extends to all of the membrane pocket assemblies and connects with the drainage bores in the frames and extends through said spacers via the drainage channel holes, said drainage channel providing an egress for the mixture contained within the membrane pockets;
   (e) a top plate that covers the plurality of assemblies, said top plate further including the supply channel that extends to the pocket assemblies and through the spacers; and
   (f) a floor plate that goes underneath the plurality of assemblies, said floor plate further including the drainage channel that extends from the pocket assemblies and through the spacers.

2. The membrane module of claim 1 further comprising a housing that contains the plurality of pocket assemblies, spacers, supply channel, and drainage channel and which incorporates the top plate as the top of the housing and floor plate as the bottom of the housing, wherein said housing provides for the gas stream to flow in the area formed between spacers and pocket assemblies in a direction parallel to the pocket assemblies.

3. The membrane module of claim 1 wherein the gas permeable liquidproof membrane is microporous expanded polytetrafluoroethylene having a thickness of 5–200 micrometers and an average pore diameter of 0.02–1.0 micrometers, suitable to permit removal of said undesirable gaseous substances through said membrane.

4. The membrane module of claim 1 wherein the gas permeable liquidproof membrane is microporous expanded polytetrafluoroethylene having a thickness of 10–50 micrometers and an average pore diameter of 0.05–0.2 micrometers, suitable to permit removal of said undesirable gaseous substances through said membrane.

5. The membrane module of claim 1 wherein the gas permeable liquidproof membrane is supported with an air-permeable carrier material which is selected from the group consisting of non-woven, perforated films and suitable textiles.

6. The membrane module of claim 5 wherein the air-permeable carrier material is welded to the frame.

7. The membrane module of claim 1 wherein each of the assembly frames is rectangular having two lateral legs such that the supply bore is within one lateral leg and the drainage bore is within the other lateral leg so that the bores face each other.

8. The membrane module of claim 7 wherein the lateral legs are connected with each other by cross members.

9. The membrane module of claim 7 wherein a plurality of supply bores are arranged in one lateral leg and a plurality of drainage bores are located in the second lateral leg.

10. A membrane module of claim 1 wherein the two parallel surfaces of the frame are the top and bottom surfaces respectively and the gas-permeable material is attached to both surfaces of the frame with means for attaching and wherein said means for attaching is selected from the group consisting of a weld or glue.

11. The membrane module of claim 1 wherein the spacers between the membrane pocket assemblies serve as seals and a supporting structure is arranged in the area between the adjacent membrane pocket assemblies and between the spacers.

12. The membrane module of claim 11 wherein the supporting structure is a rigid foil with a zig-zag profile.

13. The membrane module of claim 11 wherein the supporting structure has an open pore structure consisting of flex-resistant components selected from the group consisting of fibers and wires.

14. A process to remove undesirable gaseous substances from a gas stream comprising the steps:
   (a) flowing the gas stream containing the undesirable gaseous substances adjacent a membrane pocket wherein the membrane pocket includes a chamber containing a mixture selected from the group consisting of a reaction liquid and a suspension of micro-organisms and a membrane that encloses said chamber, wherein the membrane is a liquidproof material of hydrophobic microporous expanded polytetrafluoroethylene, wherein the mixture is suitable to react with the undesirable gaseous substances;
   (b) permeating the gas stream through the membrane; and
   (c) interacting the undesirable gaseous substances with the mixture so as to remove the undesirable gaseous substances from the gas stream and cause the gas stream to be purified.

15. The process to remove undesirable gaseous substances from a gas stream as described in claim 14 wherein a plurality of adjacent membrane pockets are used and the gas stream containing the undesirable gaseous substances flows within an area located between the adjacent membrane pockets.

16. An assembly for use in flue gas purification comprising a plurality of membrane modules arranged and connected within a housing wherein each membrane module comprises:
   (a) a plurality of planar membrane pocket assemblies stacked on top of one another so as to be parallel to the direction of flow of the gas stream, wherein each assembly further comprises:
      (i) a flat circumferential frame having two parallel surfaces, wherein the frame determines the outer contours of each assembly, said frame containing a supply bore and a drainage bore;
      (ii) a gas permeable liquidproof membrane that covers both parallel surfaces of the frame so as to form a pocket in said frame; and
      (iii) a mixture selected from the group consisting of a reaction liquid and a suspension of micro-organisms located within the pocket, wherein the mixture enters the pocket through the supply bore and exits from the pocket through the drainage bore;
   (b) a plurality of spacers wherein spacers are located between two adjacent pocket assemblies so that a spacer is at each side of the housing to form a minimum distance between adjacent assemblies through which the gas stream flows;
   (c) a supply channel that extends to all membrane pocket assemblies and spacers, said supply channel providing the mixture to all pocket assemblies via the supply bore;
   (d) a drainage channel that extends to all membrane pocket assemblies and spacers, said drainage channel accessible to the drainage bore of each pocket assembly so that the mixture is drained through said channel;
   (e) a top plate that covers the plurality of assemblies, said top plate further including the supply channel that extends through the assemblies; and
   (f) a floor plate that goes under the plurality of assemblies; said floor plate further including the drainage channel that extends through the assemblies.

* * * * *